United States Patent [19]

Maxwell et al.

[11] Patent Number: 4,945,939
[45] Date of Patent: Aug. 7, 1990

[54] PH CONTROL SYSTEM FOR AN AQUEOUS LIQUID RESERVOIR

[76] Inventors: Richard Maxwell, 2021 E. 56th; David L. Pinnell, 3709 E. 29th, both of Odessa, Tex. 79760

[21] Appl. No.: 430,299

[22] Filed: Nov. 2, 1989

[51] Int. Cl.[5] .......................................... G05D 11/08
[52] U.S. Cl. ........................................ 137/93; 137/5
[58] Field of Search .............................. 137/5, 91–93; 222/52

[56] References Cited

U.S. PATENT DOCUMENTS

| | | | |
|---|---|---|---|
| 3,554,212 | 1/1971 | Maroney | 137/93 |
| 4,306,581 | 12/1981 | Alandt | 137/93 |
| 4,460,008 | 7/1984 | O'Leary | 137/93 |

*Primary Examiner*—Robert G. Nilson
*Attorney, Agent, or Firm*—Robert C. Peterson

[57] ABSTRACT

An aqueous liquid reservoir system has a flow line for circulating a portion of the aqueous liquid from the reservoir and returning such aqueous liquid back to the reservoir. The flow line has an injection means for inducing quantities of pH affecting liquid into the flow line. A pH probe means is coupled to the flow line upstream of the injection means for detecting the pH of the aqueous liquid from the reservoir. The system includes a computer control which compares the pH from the pH probe means with a preselected pH and activates dispensing means to provide a measured quantity of pH affecting liquid for injecting into the flow line responsive to aqueous liquid flowing therein to maintain the pH of the aqueous liquid within the preselected pH tolerance. The measured quantities of pH affecting liquid are provided by a control chamber means having a gravitational feed system for the pH affecting liquid.

12 Claims, 1 Drawing Sheet

PH CONTROL SYSTEM FOR AN AQUEOUS LIQUID RESERVOIR

BACKGROUND OF THE INVENTION

I. Field of the Invention

This invention relates to controlling the pH of an aqueous liquid reservoir system such as would be found in the typical operation of cooling towers which circulate water through process heat exchangers for indirect heat transfer. Likewise the invention relates to any similar liquid reservoir system in which pH is subject to consistently increasing or consistently decreasing an inherent characteristic of the liquid reservoir system where it is desireable to maintain the pH within certain limits. The pH control system also relates to sequentially or intermittently injecting pH affecting liquid into the reservoir for maintaining the desired pH in the aqueous liquid system reservoir. It should also be noted that the inventive system relates to maintenance of basic and acidic aqueous liquid systems pH control.

II. Description of Prior Art

In the past much effort has been made in the area of understanding the mechanism and techniques of controlling pH in an aqueous liquid system. In all such systems chemical reactions would be taking place in varying degrees. As well pointed out in the prior art, pH is a non-linear function in as much as it represents a logarithmic function of the concentration of the hydrogen ion. Thus pH control, where the pH is determined and then an acidic or basic liquid is induced into the system to raise or lower the pH to the desired level, is more complex than a straight forward linear control of other reactants in a chemical process.

U.S. Pat. No. 4,053,743 to Niemi, Method for Controlling the pH and Other Concentration Variables, as well as U.S. Pat. No. 4,239,493 to Niemi et al, Method an Apparatus for Controlling the pH, amply discussed the problems associated with controlling the pH in chemical reaction systems. The Niemi et al patent describes a system in which the pH measurement is transformed to a concentration quantity such as hydrogen ion concentration and the reference value of pH is likewise transformed into the same concentration quantities such as hydrogen ion concentration. Then the patentees determine by means of a disassociation equation, a final feedback quantity which may be a function of independent concentration quantity based on other measurements at the output of the system in addition to the function of the concentration suggested as the hydrogen ion concentration. The patentees then suggest determination of a final reference value which may depend upon the independent concentration quantity as well as the concentration suggested as the hydrogen ion concentration.

In the chemical process industry water is used for indirect heat exchange and is recirculated through a cooling tower arrangement where it is cooled and collected for recirculation in the basin or tower bottom. In such a system the water entering the tower is cooled by air from outside as water drops from the place of entry through the tower to the basin in the bottom of the tower. During the process some of the water evaporates and some is carried from the tower entrained in the air.

A result of this water loss is to increase the concentration of dissolved solids or salts in the cooling tower water system. To prevent an excessive increase in salt concentration, water from the system is discharged, the operation is blown down, and evaporative and entrainment water losses or blow down losses are replaced by fresh or makeup water.

In order to prevent precipitation of ions in solution thus forming scale on the surface of the system or reducing the efficiency of heat exchange the pH of the water must be lowered by the addition of an acid. In aqueous systems problems arise in controlling pH and salt concentration because of wide fluctuations in pH and other characteristics such as conductivity.

In these situations, heat exchangers and cooling tower treating has previously been dealt with in a manner in which the pH of the treated water in the cooling tower basin is determined from a side stream off of the output from the cooling tower basin to the heat exchange system. In the case where the pH is determined to be above the desired range a pH controller coupled to a pH cell would activate a timer unit or control system to open valves and discharge a measured quantity of acid directly into the cooling tower basin. One such system is described in U.S. Pat. No. 787,281 to J. C. Ward, Jr., as assignor to Phillips Petroleum Company. The Phillips patent describes a system using air pressure and pneumatic controls responsive to the pH controller output for controlling the addition of acid to the cooling tower basin.

One of the problems in such a system is well pointed out in the Phillips patent which states that although pH of water in the cooling tower basin is normally controlled within a desired range by the intermittent introduction therein of a predetermined volume of acid from the acid source the rate of change of pH of water circulating through the heat exchanger system will at times vary to an extent that the measured amount of acid normally admitted to the cooling tower basin is more than necessary for regulating of the pH of the water within the desired range, and consequently the pH falls to a value below the intended range which is undesired from the standpoint of unduly high corrosive effects of the low pH water. The Phillips patent describes that the excessive introduction of acid to the cooling tower basin is reduced by continuous measuring pH of water in basin by circulating a side stream from the discharge line through the pH cell, then when the pH controller detects the pH below the predetermined minimum it operates to prevent additional acid from entering the cooling tower basin until the system itself has recovered.

However, one of the deficiencies in the Phillips system, and in the cooling tower art in general, is if the pH cell gave a false signal which indicated demand for acid within the desired range acid would continually be placed into the coolinq tower basin without triggering the pH controller to stop the pressure system for adding additional acid. This clearly could happen if the side stream became clogged and the pH cell continuously read a stagnant liquid side stream.

Other patents obtained by Applicants' patent search are as follows:

| U.S. Pat. No. | Date of Issue |
| --- | --- |
| 3,733,473 | May 15, 1973 |
| 4,762,796 | August 9, 1988 |
| 4,273,146 | June 16, 1981 |

SUMMARY OF THE INVENTION

I. NEW AND DIFFERENT FUNCTION

The present invention provides a method by which it is possible to automatically control the pH in an aqueous liquid reservoir system by adding pH affecting liquid, such as acids or bases depending on whether the system has an increasing pH tendency or a decreasing pH tendency from the desired or target pH, or both. In accomplishing this pH control, the system provides gravitational filling of a metering chamber filled from a control or day tank. A side stream from the output of the aqueous liquid reservoir system is circulated through a pH detector and injector for injecting measured quantities of pH affecting liquid into the side stream and is then returned to the aqueous liquid reservoir system. A control computer is operably connected to compare the pH reading from the pH detector with a preselected or target pH level. Whenever the pH of the aqueous liquid from the reservoir deviates from the target pH by more than the acceptable tolerance the computer activates the control chamber having the measured quantity of pH affecting liquid therein and the injector means which injects the pH affecting liquid into the flow line responsive to aqueous liquid flowing therein. It should be noted if the side stream becomes stagnant and the pH of the aqueous liquid therein is out of tolerance the injector will not respond to the computer control and inject further pH affecting liquid into the aqueous liquid reservoir system, and thus prevents the problem described in the Phillips patent. The control computer operates the entire pH control system and the desired parameters are preset into the computer to provide for time delays and overrides in dispensing pH affecting liquid into the side stream. Thus the system would alarm whenever malfunctions occur in any of the various components of the pH control system. The control computer allows a delay from the time pH affecting liquid is injected into the side stream for the system to stabilize before injecting additional pH affecting liquid. However, in the event the pH of the aqueous liquid further deviates from the tolerance before its stabilizes additional pH affecting liquid will be injected responsive to the control computer detecting the further increase in deviation from the target pH outside the permitted tolerance. This override is repetitive for increasing deviations until the planned maximum pH affecting liquid has been reached.

II. OBJECTS OF THE INVENTION

It is an object of the invention to provide a pH control system for an aqueous liquid reservoir system wherein a side stream from the output of the aqueous liquid reservoir is circulated through a pH detector, then through an injector for injecting pH affecting liquid therein and then returned to the aqueous liquid reservoir where it is mixed with the aqueous liquid in the aqueous liquid reservoir system in order to maintain a target pH within a permitted tolerance, wherein a computer compares the pH of the aqueous liquid in the side stream with a preselected or target pH and activates dispensing a measured quantity of pH affecting liquid through an injector into the side stream so long as aqueous liquid is flowing from the aqueous liquid reservoir and returning thereto.

It is a further object of the invention to provide a pH control system for an aqueous liquid reservoir system having a flow line for circulating a portion of the aqueous liquid from the reservoir and returning the same which includes a pH detector in the flow line and an injector down stream of the pH detector for injecting pH affecting liquid into the side stream responsive to the output of the control computer detecting the need to add pH affecting liquid to maintain the preselected or target pH within the tolerance allowed and responsive to aqueous liquid flowing therein; the pH control system includes a day tank for supplying by gravity a metering chamber which in turn supplies measured quantities of pH affecting liquid to the injector for dispensing into the flow line.

These and other objects of the invention will become apparent throughout the remainder of this application.

A BRIEF DESCRIPTION OF THE DRAWINGS

FIG. 1 shows a typical installation with the computer control panel displayed. FIG. 2 shows a schematic piping diagram of the pH control system for use with an aqueous liquid reservoir system.

DETAILED DESCRIPTION OF THE PREFERRED EMBODIMENT

Figure 1:
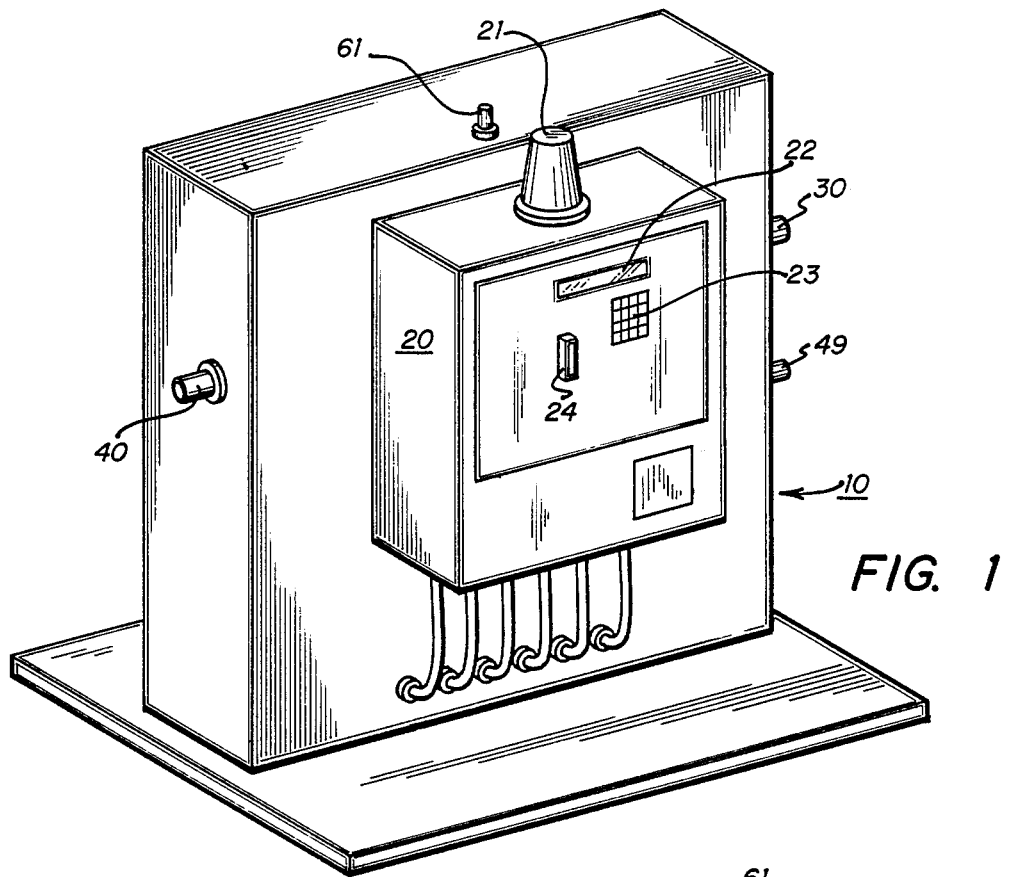
Figure 2:
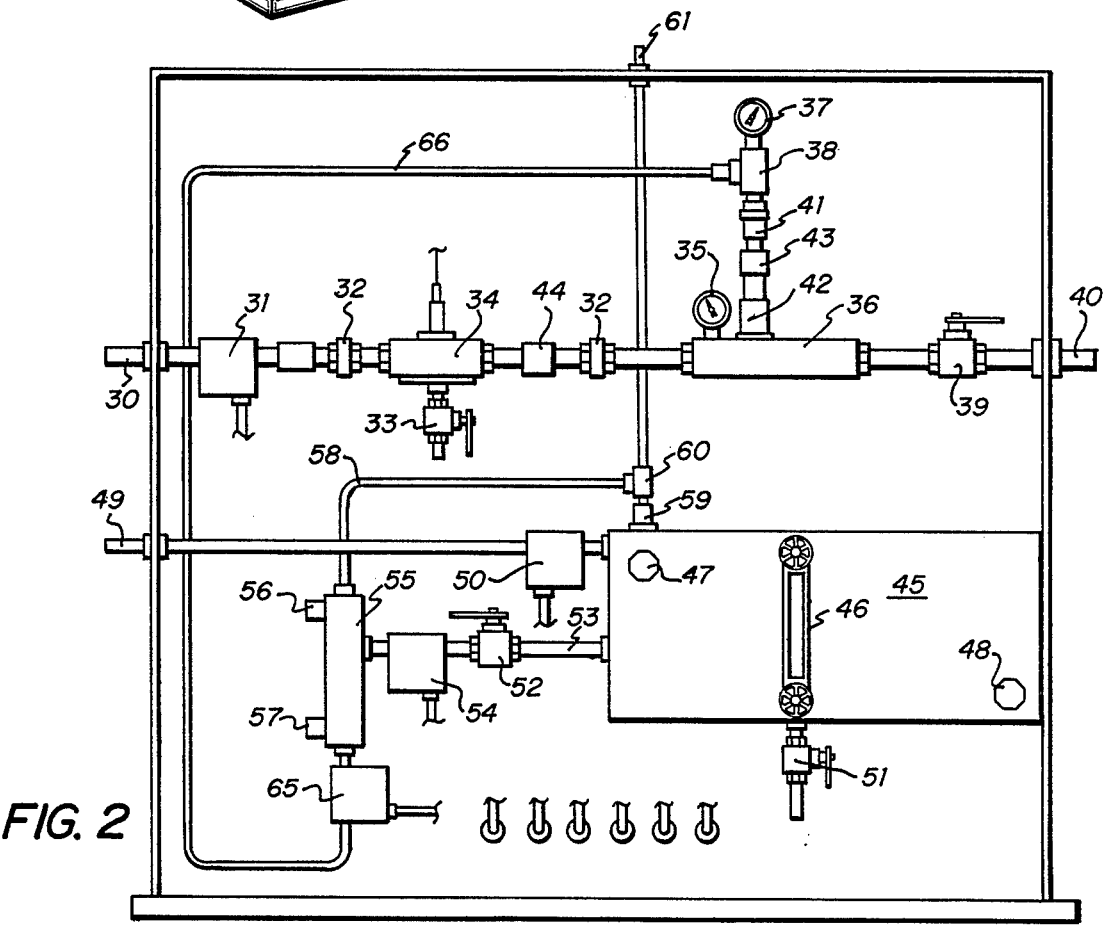

The computer pH control system will be described in relationship to a heat exchanger system employing a cooling tower wherein the pH over a period of time increased and requires acid injection to maintain it at the desired or target pH. However, it should be understood that the computer pH control system would include a dual system of supply either acids or bases to the liquid reservoir system depending upon the pH fluctuations requiring control.

A side stream from the outlet of a cooling tower basin which flows to the heat exchangers flows into the computer control pH system at inlet 30. An inlet valve 31 controls the inlet of water into the pH control system. The inlet flow is coupled by union 32 to pH probe means 34, the output is coupled optionally through a check valve 44 by union 32 to an eductor 36 for injecting measured quantities of pH affecting liquid into the stream flowing from the cooling tower basin. The eductor is equipped with a pressure gauge 35 to indicate the pressure in the flow line described later herein. The output of the stream from the eductor 36 is connected through mechanical shut off valve 39 to outlet 40 which attaches to a return line returns to the cooling tower basin and completes the loop of the side stream from the cooling tower heat exchanger loop back to the cooling tower basin or reservoir. The pH detector means 34 has a mechanical valve 33 for purposes of draining the system at the pH detector means 34.

Assuming, the system will require only acid for pH control, suitable acid is provided to the system in the following manner. The bulk acid storage tank not shown is suitably positioned to provide gravitational flow of acid into acid inlet line 49 through acid flow valve 50 into control tank 45. The control tank 45 has a sight gauge 46 for visual determination of the amount of acid contained therein. The control tank 45 is equipped with a high level float 47 and a low level float 48 which through the computer control the operation of valve 50 for filling control tank 45 from the bulk storage tank (not shown) by gravitational flow through inlet flow line 49. The control tank 45 is also equipped with a mechanical valve 51 for draining the system. Control tank 45 has an outlet 53 coupled through a manual shut-off valve 52 and through acid control valve 54 into control chamber 55. Control chamber 55 has a high level sensor 56 and a low lever sensor 57 which provides signals to the control computer for operating valves 54 and 65. Control tank 45 has a vent 59 and control chamber 55 has a vent 58. The vents 58 and 59 are connected through a tee 60 to a vent line 61 which may be vented to the atmosphere or vented back to the bulk acid storage tank (not shown) where practical. The vent line 61 is of a height in relation to the bulk acid storage that if the high level float 47 fails, gravitational flow would not cause acid to exit through vent line 61. The outlet of control chamber 55 is coupled through outlet valve 65 into flow line 66 which is coupled by a tee 38 through a union 41, and a nipple 42, and a check valve 43 into the suction port of eductor 36. A vacuum gauge 37 is connected to the top of the tee 38 to indicate the vacuum created in the eductor 36. Control computer 20 as seen in FIG. 1 optionally includes a warning beacon 21 which indicates malfunctions of the system. The computer is provided with a liquid crystal display (LCD) 22 which provides a visual readout in response to entries in keyboard 23. The computer control panel also includes a printout port 24 which may be coupled to an output recorder not shown to record information regarding the operation of the system.

The operation of the pH controller will now be described with reference to the drawings. Once the operator has determined the desired pH to maintain in the heat exchanger water system the pH is entered into the computer through key board entry 23 which establishes the desired or target pH as well as the tolerance for operation of the pH control system. Upon the system being activated acid from the bulk storage tank not shown is provided through inlet flow line 49 into the control tank 45 in response to signal from low float 48 causing the acid flow valve 50 to open and allow gravitational flow of acid into the control tank 45 until a signal from high level float 47 causes acid flow valve 50 to be closed. The description of the operation will continue with the assumption that the control chamber 55 is in its normal empty condition, and the control tank 45, which is a day tank, is full and ready for the commencement of operation. When the operation is ready to commence acid flow valve 50 is closed, valve 54 is closed, valve 65 is closed and manual valve 52 is open, thus no acid can flow from the bulk tank through inlet flow line 49 into the control tank 45 and no acid can flow from the control tank 45 into the control chamber 55 and control chamber 55 remains empty. In order to commence operation and control of the pH in a cooling tower basin the valve 31 is opened which permits the side stream from the cooling tower basin to flow into inlet line 30 through pH probe 34 through eductor 36 and through open mechanical valve 39 to the outlet 40, and return to the cooling tower basin. Alternately, a check valve 44 may be installed between the pH probe 34 and eductor 36. The pH probe 34 detects the pH, for example, at the target pH thus the electric acid valve 50, acid control valve 54 and acid outlet 65 remain closed and inlet valve 31 remains open. The pH probe is continuously monitoring the pH and sending the information to the computer 20. Now if the pH probe 34 detects a pH that has deviated upward out of the tolerance from the target pH, then the system computer 20 automatically opens control valve 54 in response to low level sensor 57 signal of low acid level in control chamber 55 which allows acid from the control chamber 45 to flow until the high level sensor 56 signals for control valve 54 to be closed thus control chamber 55 is filled with a measured or predetermined quantity of acid. When control chamber 55 is full and control valve 54 is closed, then the computer 20 automatically opens outlet valve 65 and since the inlet valve 31 and manual valve 39 are open permitting the side stream to flow into the pH control system 10 through inlet 30 and out of outlet 40, a vacuum is created by the eductor at the vacuum port 42 which educts the acid out of control chamber 55 and injects it into the side stream flowing through flow line 30 through outlet 40 back to the cooling tower basin. Once low level sensor 57 of control chamber 55 detects the metered quantity of acid in control chamber 55 has been discharged the computer closes outlet valve 65. Once the acid has been injected into the flow line 30 by eductor 36 the computer will not activate valve 65 for a preselected period of time perhaps 5 minutes for the cooling tower water to stabilize with the acid injected therein. When additional acid is required the computer causes valve 54 to open and admit another measured quantity of acid into control chamber 55 and then in response to high level sensor 56 control valve 54 is closed. Since the day tank or control tank 45 has sufficient acid therein so that low level float 48 does not activate the computer to open control valve 50 acid from the bulk tank (not shown) will not flow into the control tank. Notwithstanding the preselected delay to prevent further acid injection into the side stream flow if the pH probe determines that the pH is continuing up an additional measured quantity of acid from control chamber 55 will be injected into the side stream as previously described by activating valve 65 but retaining valve 54 closed.

The operator may set a time of which the contents of the control tank should be consumed, for example, a time frame from 4 to 6 hours or even 8 hours depending on the particular system being used. In other aqueous liquid reservoir system these times could vary significantly. In any event the system is set to provide a signal on the LCD read out and a field tank alarm will be displayed indicating that the control tank is out of acid and control valve 50 cannot be opened because of the timed delay has not been exceeded such an alarm that an indicate that a much higher demand for acid is occurring then planned by the operator and an investigation in warranted. The system is designed to provided two basic readouts available on the LCD display which indicates the use rate of acid for the last hour and whether the system is feeding acid or waiting. The system also can be used as a manual feed system with the user programming a frequency and quantity into the computer while the pH probe was not being used.

The system is provided with fail safe features which cause valves 31,50,54 and 65 to go to or remain closed, displays an alarm on the LCD and turn on the beacon light 21. The alarm display will also printout a message indicating the type of alarm condition that exists. A valve alarm may be programmed to go off if any valve does not reach the assigned position within 15 seconds. Normally such a valve should only take 5 seconds to operate. The alarm message would identify the valve that failed so corrective measures can be taken. If the AC power is disconnected, the unit would display an AC power off if a working battery is provided. The user may program both a high and a low pH alarm points. If the pH goes beyond these limits the alarm is generated and the message would display pH high alarm or pH low alarm. Of course under a pH alarm the valves 50,54,65 and 31 would be shut down. It should be noted that the any time valve 31 is closed there will be no vacuum on line 66 to control chamber 55 through valve 65 whether it is opened or closed and no acid in any event can be injected into the side stream.

Additional alarms will sound if the control tank 45 requires more than 15 minutes to fill. A bulk fill alarm will be displayed and the system will shut down so that the bulk tank supply to the control tank can be corrected. Likewise, if the control tank 45 is emptied and low level float 48 signals refilling of the control tank before the preselected time for refilling the tank has expired an alarm will be sounded and alert the operator that the system is demanding more than the preselected acid quantity for the period desired.

It will be understood that the foregoing description of the preferred embodiment is only one example of the use of the computer control pH installation. The system could be used in a aqueous liquid reservoir system wherein it was desired to maintain a basic pH rather than a acidic pH. Further it will be recognized that other aqueous liquid systems other than heat exchangers employing cooling towers may be controlled by the inventive system. Moreover other alarms could be utilized in computer controlling of the pH controlled system.

What is claimed is:

1. In an aqueous liquid reservoir system having a pH control, the improvement comprising,
    a pH control system having a flow line for circulating a portion of the aqueous liquid from the reservoir and returning such aqueous liquid back to the reservoir,
    a storage reservoir means for holding pH affecting liquid and dispensing a measured quantity of pH affecting liquid,
    an injection means within said flow line coupled to said storage reservoir means for injecting pH affecting liquid from said storage reservoir into said flow line whenever activated responsive to aqueous liquid flowing therein,
    a pH probe means upstream of said injection means for detecting the pH of the aqueous liquid from the reservoir, and
    a control computer for comparing the pH of the aqueous liquid with a preselected pH and activating the injector means and storage reservoir means for injecting measured quantities of pH affecting liquid intermittently into the aqueous liquid whereby the pH of the aqueous liquid is maintained within a preset tolerance of the preselected pH.

2. The pH control system of claim 1 wherein said storage reservoir means includes a control tank for limiting the overall quantity of pH affecting liquid available in a preselected period of time and a control chamber for dispensing measured quantities of the pH affecting liquid available therefrom.

3. The pH control system of claim 1 wherein the injection means is an eductor.

4. The pH control system of claim 2 wherein the injection means is an eductor.

5. The pH control system of claim 1 wherein the aqueous liquid reservoir system is a heat exchanger cooling water system with a cooling tower and said aqueous liquid is cooling water.

6. In an aqueous liquid reservoir system having pH control, the improvement comprising;
    a pH control system having a flow line for circulating a portion of the aqueous liquid from the reservoir and returning such aqueous liquid back to the reservoir,
    a control chamber means for dispensing a measured quantity of pH affecting liquid,
    an injection means within said flow line coupled to said control chamber means for injecting upon activation and responsive to aqueous liquid flowing therein the measured quantity of pH affecting liquid dispensed from said control chamber means into said flow line,
    a pH probe means upstream of said injection means for continuously reading the pH of the aqueous liquid flowing from the aqueous liquid reservoir, and
    a control computer for comparing the pH of the aqueous liquid with a preselected pH and activating the injector means and control chamber means to inject measured quantities of pH affecting liquid intermittently into the aqueous liquid whenever necessary to maintain the pH of the aqueous liquid within the preselected pH tolerance of the preselected pH.

7. a pH control system for an aqueous liquid system comprising;
    an aqueous liquid line having an inlet for receiving a portion of the output from an aqueous liquid system and an outlet for returning such aqueous liquid to such aqueous liquid system,
    an electric flow valve in said aqueous liquid line to control the flow of aqueous liquid therethrough,
    a pH probe means downstream of said flow valve for determining the pH of the aqueous liquid entering the aqueous liquid line,
    an injection means downstream from said pH probe means in said aqueous liquid line for injecting pH affecting liquid into said aqueous liquid line whenever activated and responsive to aqueous liquid flowing therein,
    a control chamber means for dispensing a measured quantity of pH affecting liquid, and
    a computer for comparing the pH of the aqueous liquid with a preselected pH and activating the injection means and control chamber means to inject measured quantities of pH affecting liquid intermittently into the aqueous liquid whenever required to maintain the pH of the aqueous liquid within the preselected pH tolerance of the preselected pH.

8. The pH control system of claim 7 wherein said control chamber means includes a control chamber for metering a measured quantity pH affecting liquid and a control tank for providing a limited numbered of measured quantity of pH affecting liquid to said control chamber.

9. The pH control system of claim 7 wherein said aqueous liquid system is a heat exchange cooling water system including a cooling tower and the pH affecting liquid is an acid or base.

10. The pH control system of claim 7 wherein the injection means is an eductor.

11. The pH control system of claim 8 wherein the injection means is an eductor.

12. The pH control system of claim 9 wherein the injection means is an eductor.

* * * * *